US009915303B1

(12) United States Patent
Parada Centeno et al.

(10) Patent No.: US 9,915,303 B1
(45) Date of Patent: Mar. 13, 2018

(54) CLUTCH SYSTEM FOR MANUAL TRANSMISSION VEHICLES

(71) Applicant: Ford Global Technologies, LLC, Dearborn, MI (US)

(72) Inventors: Jose Carlos Parada Centeno, Mexico City (MX); Elias Aram Loza Neri, Lerma (MX); Pablo Daniel Martinez, Morelia (MX); David Michael Pariseau, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/237,669

(22) Filed: Aug. 16, 2016

(51) Int. Cl.
| F16D 13/00 | (2006.01) |
| F16D 48/06 | (2006.01) |
| F16D 28/00 | (2006.01) |
| F16D 23/12 | (2006.01) |
| F16H 63/46 | (2006.01) |
| F16H 3/091 | (2006.01) |

(52) U.S. Cl.
CPC .......... *F16D 48/064* (2013.01); *F16D 13/00* (2013.01); *F16D 23/12* (2013.01); *F16D 28/00* (2013.01); *F16H 63/46* (2013.01); *F16D 2023/123* (2013.01); *F16D 2500/1023* (2013.01); *F16D 2500/1045* (2013.01); *F16D 2500/10412* (2013.01); *F16D 2500/30806* (2013.01); *F16H 3/091* (2013.01)

(58) Field of Classification Search
CPC .......... F16D 48/08; F16D 23/12; F16H 63/46
See application file for complete search history.

(56) References Cited

U.S. PATENT DOCUMENTS

| 5,928,106 A | 7/1999 | Biros, Jr. et al. |
| 6,056,669 A | 5/2000 | Marshall |
| 6,148,975 A * | 11/2000 | Shih ...................... F16D 48/068 192/3.62 |
| 7,032,697 B2 | 4/2006 | Lee |
| 8,201,679 B2 | 6/2012 | Burkhart et al. |
| 8,843,284 B2 | 9/2014 | Wolterman |
| 9,017,216 B1 * | 4/2015 | Holub ................... B60W 10/11 477/94 |

* cited by examiner

*Primary Examiner* — Derek D Knight
(74) *Attorney, Agent, or Firm* — James Dottavio; Brooks Kushman, P.C.

(57) ABSTRACT

A vehicle includes an engine, a manual transmission, and a clutch that selectively couples the engine to the transmission. The clutch includes a disk biased to engage a flywheel of the engine, a first actuator that disengages the disk in response to depression of a clutch pedal, and a second actuator that disengages the disk in response to an electric signal from a vehicle controller.

17 Claims, 5 Drawing Sheets

CLUTCH SYSTEM FOR MANUAL TRANSMISSION VEHICLES

TECHNICAL FIELD

This disclosure relates to clutch systems for manual transmissions of motor vehicles. More specifically, this disclosure relates to clutch systems having at least two parallel actuators for disengaging the clutch disk from the engine.

BACKGROUND

Motor vehicles include an engine having a crankshaft driveably connected to a transmission. The transmission includes a gearbox for changing a speed ratio between the crankshaft and a transmission output shaft. The transmission may be a manual transmission in which a driver manually shifts gears within the gearbox via a shifter. A dry friction clutch selectively couples the crankshaft to a transmission input shaft. The clutch includes a clutch disc splined to the transmission input shaft and a pressure plate that frictionally engages the disc with a flywheel of the crankshaft to transmit power from the engine to the transmission. The clutch is operated by the driver via a clutch pedal. The clutch pedal is mechanically connected to a throw-out bearing via linkages. Depression of the clutch pedal pushes the throw-out bearing into the spring to modify the clutch capacity and thus control the transfer of power between the engine and the transmission.

SUMMARY

According to one embodiment, a vehicle includes an engine, a manual transmission, and a clutch that selectively couples the engine to the transmission. The clutch includes a disk biased to engage a flywheel, a first actuator that disengages the disk in response to pedal depression, and a second actuator that disengages the disk in response to an electric signal. A vehicle controller is configured to receive an engine start signal, command the second actuator to disengage the disk, and start the engine in response to the second actuator disengaging the disk.

According to another embodiment, a vehicle includes a transmission and a clutch that selectively engages an engine and the transmission. The clutch includes a first actuator that alters clutch capacity in response to pedal movement and a second actuator that alters clutch capacity in response to an electronic signal. A controller is configured to, in response to a request for traffic assist and the transmission being in first gear, command the second actuator to alter the clutch capacity based on engine speed.

According to yet another embodiment, a manual transmission for a vehicle includes a gearbox configured to establish various power-flow paths between an input shaft and an output shaft in response to movement of a driver-operated gear shifter. A dry friction clutch includes a disk disposed on the input shaft and a pressure-plate assembly connectable to an engine flywheel. The pressure-plate assembly has a pressure plate and a spring that biases the pressure plate to frictionally engage the disk and the flywheel. A first clutch actuator has a first fork operable to disengage the clutch in response to depression of a clutch pedal. A second clutch actuator is arranged in parallel with the first clutch actuator. The second actuator includes an electric motor having a spindle and a second fork operable to disengage the clutch in response to rotation of the spindle.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
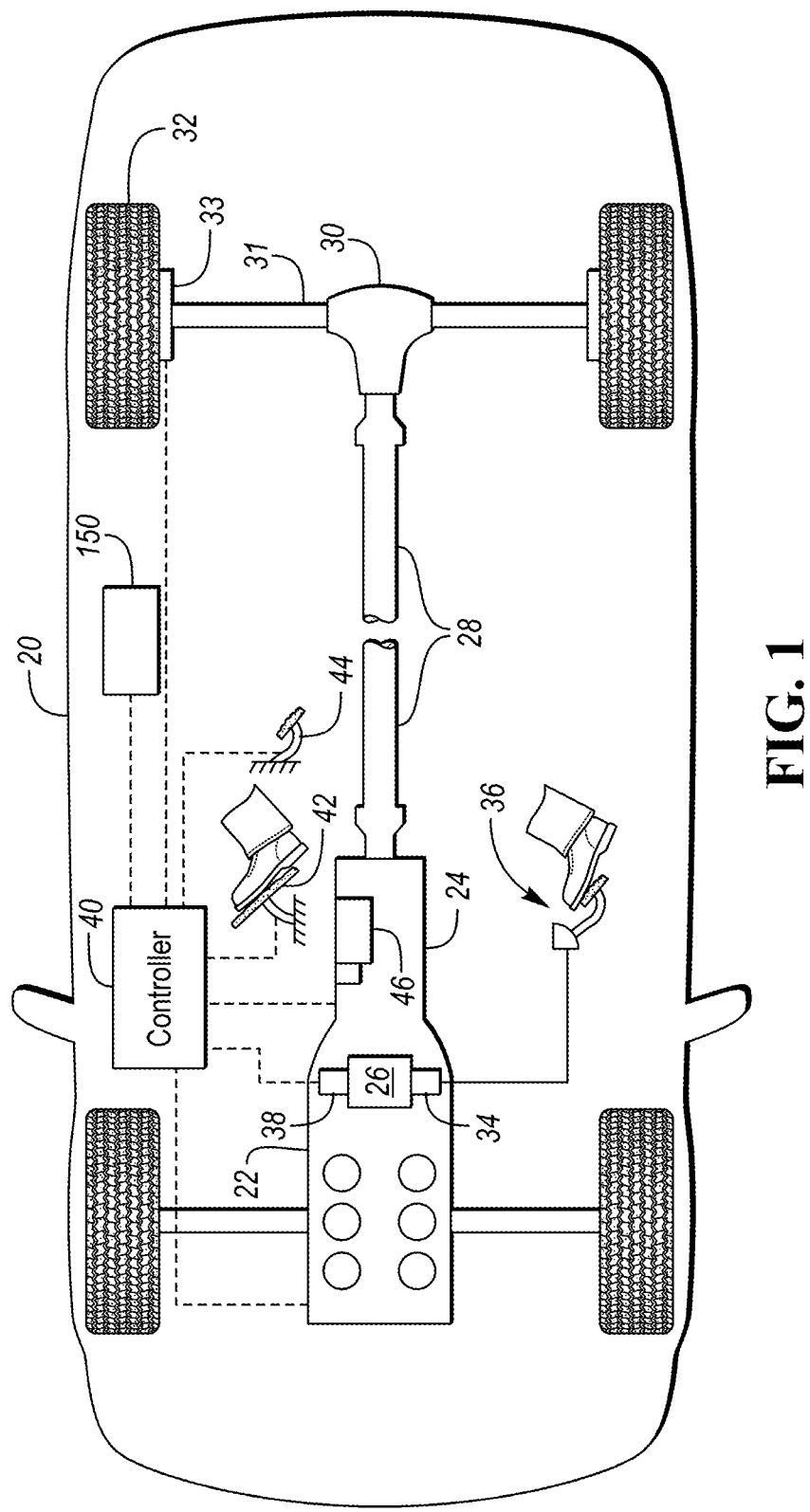
FIG. 1 is a schematic diagram of a manual-transmission vehicle.

Referring to FIG. 1, a motor vehicle 20, such as a passenger car, includes an engine 22 coupled to an input shaft of a transmission 24 via a dry friction clutch 26. The transmission 24 is a manual transmission including a gear box configured to establish various power-flow paths between the input shaft and a transmission output shaft in response to movement of a driver-operated gear shifter. Used herein, "manual transmission" refers to a transmission in which the shift forks are operated manually by the driver via the gear shifter located within the passenger cabin. The transmission output shaft is driveably connected to the differential 30 via a driveshaft 28. The differential 30 is driveably connected to the driven wheels 32 via one or more axles 31. Two components are driveably connected if they are connected by a power flow path that constrains their rotational speeds to be directly proportional.

The clutch 26 includes a pair of parallel actuators 34, 38 each individually operable to control a torque capacity of the clutch 26. Actuator 34 is a mechanical or hydraulic actuator that is controlled by a clutch pedal 36, and actuator 38 is an electronic actuator that is controlled by the controller 40. In one embodiment, the actuator 34 includes a mechanical linkage (e.g., a cable or rod) between the fork and the clutch pedal 36. In another embodiment, the actuator 34 includes a slave cylinder connected to the fork and hydraulically controlled by a master cylinder of the pedal 36. Embodiments of the electronic actuator 38 will be described in more detail below.

The vehicle 20 also includes an accelerator pedal 42 and a brake pedal 44. The accelerator pedal 42 may be mechanically connected to a throttle body of the engine 22 in order to control operation of the engine, or may be electronically connected to the controller 40, which controls operation of the throttle body according to signals received from the accelerator pedal 42. The transmission 24 may include one or more sensors 46—such as speed sensors, torque sensors, and gear sensors—in electronic communication with the controller 40.

While illustrated as one controller, the controller 40 may be part of a larger control system and may be controlled by various other controllers throughout the vehicle 20, such as a vehicle system controller (VSC). It should therefore be understood that the powertrain control unit 40 and one or more other controllers can collectively be referred to as a "controller" that controls various actuators in response to signals from various sensors to control functions of the vehicle. The controller 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The controller may communicate with the other vehicle components via a data bus or dedicated wires.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The vehicle 20 may include an electronic parking brake 33. The parking brake can be operated by the driver via an input (e.g., a button) located in the passenger cabin, and can be operated by the controller without driver input. The parking brake may include a sensor that outputs a signal to the controller indicating an engagement state of the brake. The controller 40 may control operation of the engine 22, the clutch 26, the parking brake 33, and the transmission 24 according to signals received from the sensors 46.

Figure 2:
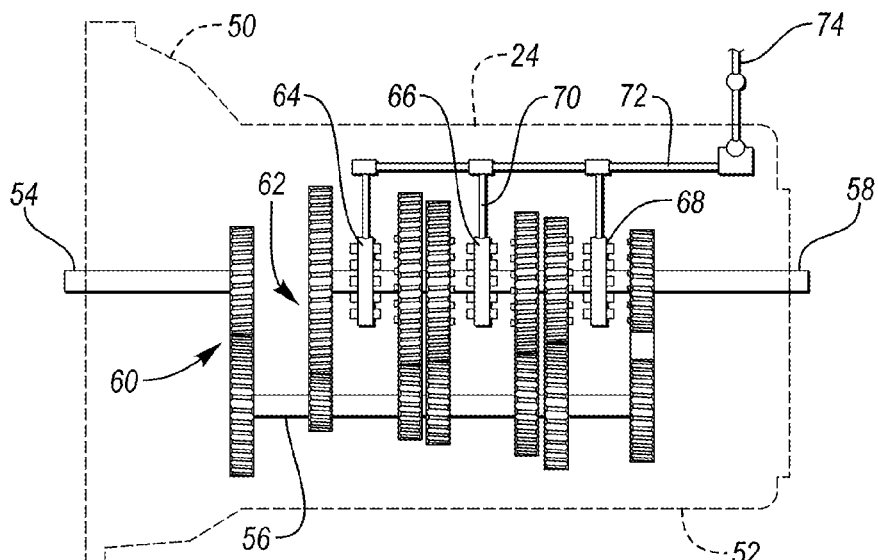
FIG. 2 is a schematic diagram of a manual transmission.

Referring to FIG. 2, the transmission 24 includes a bell housing 50 that is mounted to the engine block, and a gear box 52 that houses the various gears of the transmission. The transmission 24 includes an input shaft 54 selectively connected to the engine 22 via the clutch 26. A countershaft 56 meshes continuously with the input shaft 54 via gearing 60. A transmission output shaft 58 continuously meshes with the countershaft 56 via the drive gear pairs 62. The transmission of the illustrated embodiment is a five-speed transmission with reverse; thus the transmission includes five forward gear pairs and one reverse gear pair. The synchronizers 64, 66, and 68 selectively lock the output shaft 58 to the countershaft 56 at one of the speed ratios in order to transmit power from the input shaft to the output shaft. Each of the synchronizers may include an associated shift fork 70 connected to a shift rod 72 that is in turn connected to the gear shifter 74. Movement of the gear shifter 74 by the driver cause one of the shift forks to slide the associated synchronizer into engagement with an associated gear placing the transmission into the driver-selected gear (e.g., first gear). FIGS. 1 and 2 illustrated and described a rear-wheel-drive manual transmission, however, it is the understood that the teachings of this disclosure are equally applicable to front-wheel-drive manual transmissions and all-wheel-drive manual transmissions.

Figure 3:
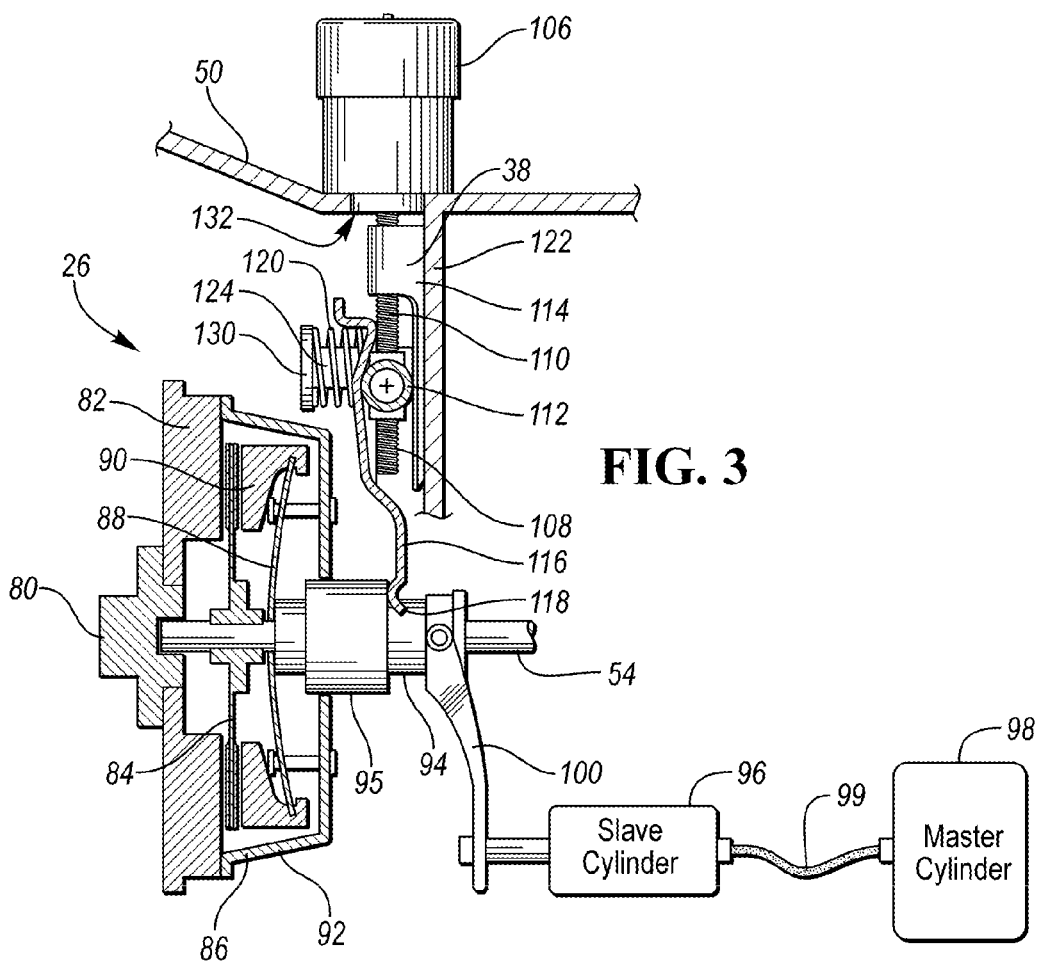
FIG. 3 is a partial cross-sectional view of a dry friction clutch having dual actuators.

Referring to FIG. 3, the clutch 26 may be a dry friction clutch that selectively couples the engine crankshaft 80 to the transmission input shaft 54. The clutch 26 includes a clutch disc 84 splined to the transmission input shaft 54. The clutch disc 84 is configured to fictionally engage a flywheel 82 that is fixed on the crankshaft 80 to transmit power from the crankshaft 80 to the input shaft 54. The clutch disc 84 may include a dampener that provides torsional isolation between the engine and the driveline when the clutch is engaged. The disk 84 may include a friction material attached to the front and back sides of the disc.

A pressure plate assembly 86 of the clutch 26 includes a cover 92 fixed to the flywheel 82, and a diaphragm spring 88 attached to the cover 92. A pressure plate 90 is biased, by the spring, to frictionally engage the disc 84 with the flywheel 82. At least one bearing (commonly referred to as a throw-out bearing) is slidably received on the input shaft 54. Movement of the at least one bearing controls the position of the diaphragm spring 88 and thus controls the amount of force the pressure plate 90 is exerting on the disk. Movement of the bearing towards the disc 84 decreases the clutch capacity and movement of the bearing away from the disc 84 increases the clutch capacity. In some embodiments, the bearing a pair of bearings independently moveable to engage the spring. In the illustrated embodiment, a first bearing 94 is connected to actuator 34, and a second bearing 95 is connected to actuator 38. The first and second bearings may be concentrically arranged on the input shaft 54 with the first bearing 94 being received on the shaft and the second bearing being received on an outer surface of the first bearing.

In the illustrated embodiment, actuator 34 is a hydraulically-actuated system that includes a slave cylinder 96 and a master cylinder 98 that are connected in fluid communication via a tube 99. The slave cylinder 96 is located in or on the bell housing and the master cylinder 98 is typically located within the passenger compartment adjacent to the clutch pedal 36. A fork 100 connects between the bearing 94 and the slave cylinder 96. Depression of the clutch pedal 36 causes the master cylinder to apply hydraulic pressure to the slave cylinder. This causes the slave cylinder to actuate the fork 100, which slides the bearing 94 into engagement with the spring 88. The illustrated hydraulic system is one of many different types of hydraulic systems contemplated by this disclosure. In an alternative embodiment, the slave cylinder may be a concentric slave cylinder disposed on the input shaft 54 and including a telescoping fork that engages the bearing 94 according to a fluid pressure supplied by the master cylinder.

Figure 4:
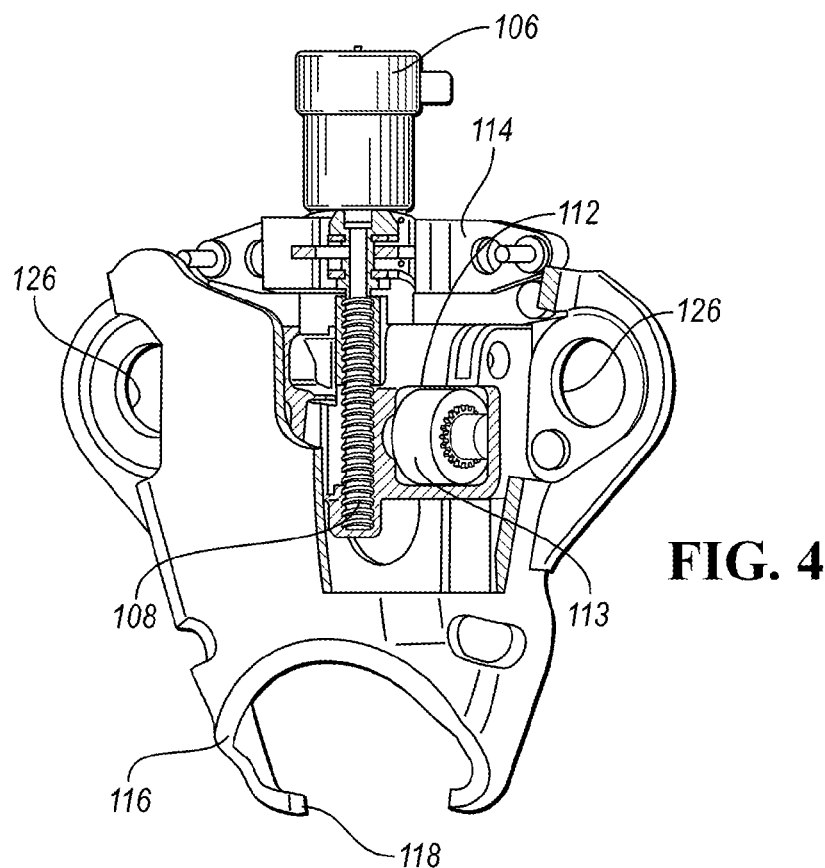
FIG. 4 is a cutaway perspective view of an electronic actuator for the dry friction clutch.

Referring to FIGS. 3, and 4, according to one embodiment, the electronic actuator 38 includes back plate 114 mounted to a portion of the transmission housing 122. The electronic actuator 38 has a drive unit including an electric motor 106 connected to the back plate 114 and a ball-screw mechanism 110. The electric motor 106 may be disposed outside of the interior of the bell housing 50 (as shown), or inside the bell housing (see FIG. 5). The electronic motor 106 is in electronic communication with the controller 40.

The ball screw mechanism 110 includes a spindle 108 driven by the electric motor 106 and a roller assembly 112. The spindle 108 is connected to the motor 106 at a proximal end and extends into an interior of the bell housing 50 via a hole 132 defined in the transmission housing. The roller assembly 112 includes features that cooperate with grooves formed on the spindle 108 to actuate the roller assembly up and down the spindle depending upon a direction of rotation of the spindle. The roller assembly also includes at least one roller 113 that engages between the back plate 114 (or the transmission housing) and a fork 116.

The fork 116 is connected to the back plate 114 via a pair of projections 124 that are received through holes 126 defined in the fork 116. A spring 120 disposed between the fork 116 and a head 130 of the projection 124 biases the fork 116 towards the back plate 114. The fork 116 includes tips 118 that connect to the bearing 95. The fork 116 is operable to slide the bearing 95 along the first bearing 94 to engage or disengage the clutch based on rotation of the spindle.

Rotation of the spindle 108 in a first direction moves the roller assembly 112 away from the motor 106, which moves the tips 118 away from the back plate 114. Movement of the tips 118 away from the back plate 114 forces the bearing 95 into the diaphragm spring 88 reducing the torque capacity of the clutch. Rotation of the spindle 108 in a second direction moves the roller assembly 112 towards the motor 106, which moves the tips 118 towards the back plate 114. Movement of the tips towards the back plate 114 pulls the bearing 95 away from the spring to increase the torque capacity of the clutch. Thus, the controller 40 can control the torque capacity of the clutch 26 by rotating the spindle 108 via the electric motor 106.

Figure 5:
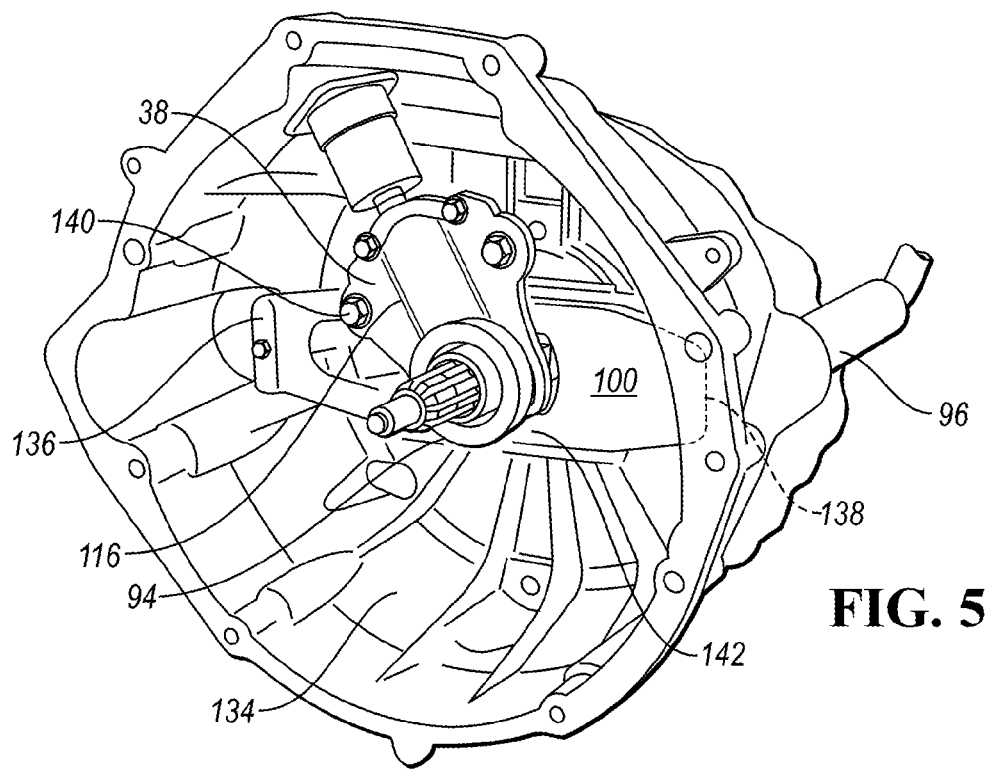
FIG. 5 is a perspective view of the clutch actuators disposed in a bell housing of the manual transmission shown in FIG. 2.

Referring to FIG. 5, the actuators 34 and 38 are arranged in parallel and each actuator is individually capable of operating the clutch. Each of the actuators 34 and 38 may be disposed in the interior 134 of the Bell housing 50. The fork 100 of the mechanical actuator 34 includes a first end 136 connected to the Bell housing 50 by a fastener 140. A second end 138 of the fork 100 is connected to the slave cylinder 96. A bearing-engagement portion 142 of the fork 100 is connected to first features of the bearing 94. Actuation of the slave cylinder 96 pushes the second end 138 towards the engine 22 causing the bearing-engagement portion 142 to slide the bearing 94 along the input shaft 54 towards the spring 88 to reduce the clutch capacity.

The electric actuator 38 is arranged within the bell housing 50 such that the fork 116 engages the bearing 95. In response to electric signals, the spindle 108 may be rotated in the first direction causing the fork 116 to slide the bearing 95 forward along the first bearing 94 to reduce the clutch capacity, or may be rotated in the second direction slide the bearing away from the clutch to increase the clutch capacity. The actuators 34 and 38 and bearing are arranged such that actuation of the bearings by one of the actuators is not impeded by the bearing of the other actuator.

Popularity of manual transmissions has declined due to certain inherent features of the manual transmissions currently on the market. For example, driving a manual vehicle in stop-and-go traffic can be cumbersome, and certain features (such as remote start) are not typically offered on manual vehicles. Despite these drawbacks, many people, especially driving enthusiasts, prefer the increased driver interaction that manual transmissions offer. Including a dual-actuator clutch (e.g., clutch 26 described above) can eliminate some of the negative attributes commonly associated with manual transmissions while still providing the desirable attributes such as the increased interaction with the vehicle. Inclusion of the electronic actuator allows the computer to take over clutch operation during cumbersome times (e.g., stop-and-go traffic) and when the driver is not in the vehicle (remote start), and allows the driver to control clutch operation during other times. By removing the negative aspects of the manual transmission, popularity of manual transmission may be increase. Described below are example feature that may be added to a manual-transmission vehicle due to the addition of the electric actuator.

Many new automatic-transmission vehicles include the option for remote start. Remote start allows a user to start the vehicle remotely using a key fob or other remote device such as a cell phone. While remote start is typically offered with automatic transmissions, their manual-transmission counterparts typically do not include the option for remote start due to the differences between automatic and manual transmissions.

To successfully remote start a manual transmission, the controller must accurately determine and ensure that the engine and the transmission are decoupled or that the transmission is a neutral prior to starting to the engine to ensure that the vehicle does not launch when the engine is started. The electronic actuator described above provides a solution to the above-mentioned problems associated with manual-transmissions and remote start. The inclusion of the electronic actuator provides a reliable means for the vehicle controller to automatically decouple the engine and the transmission without driver input. Thus, the electronic actuator can be used as part of a remote-start sequence allowing manual-transmission vehicles to have remote start capabilities.

Figure 6:
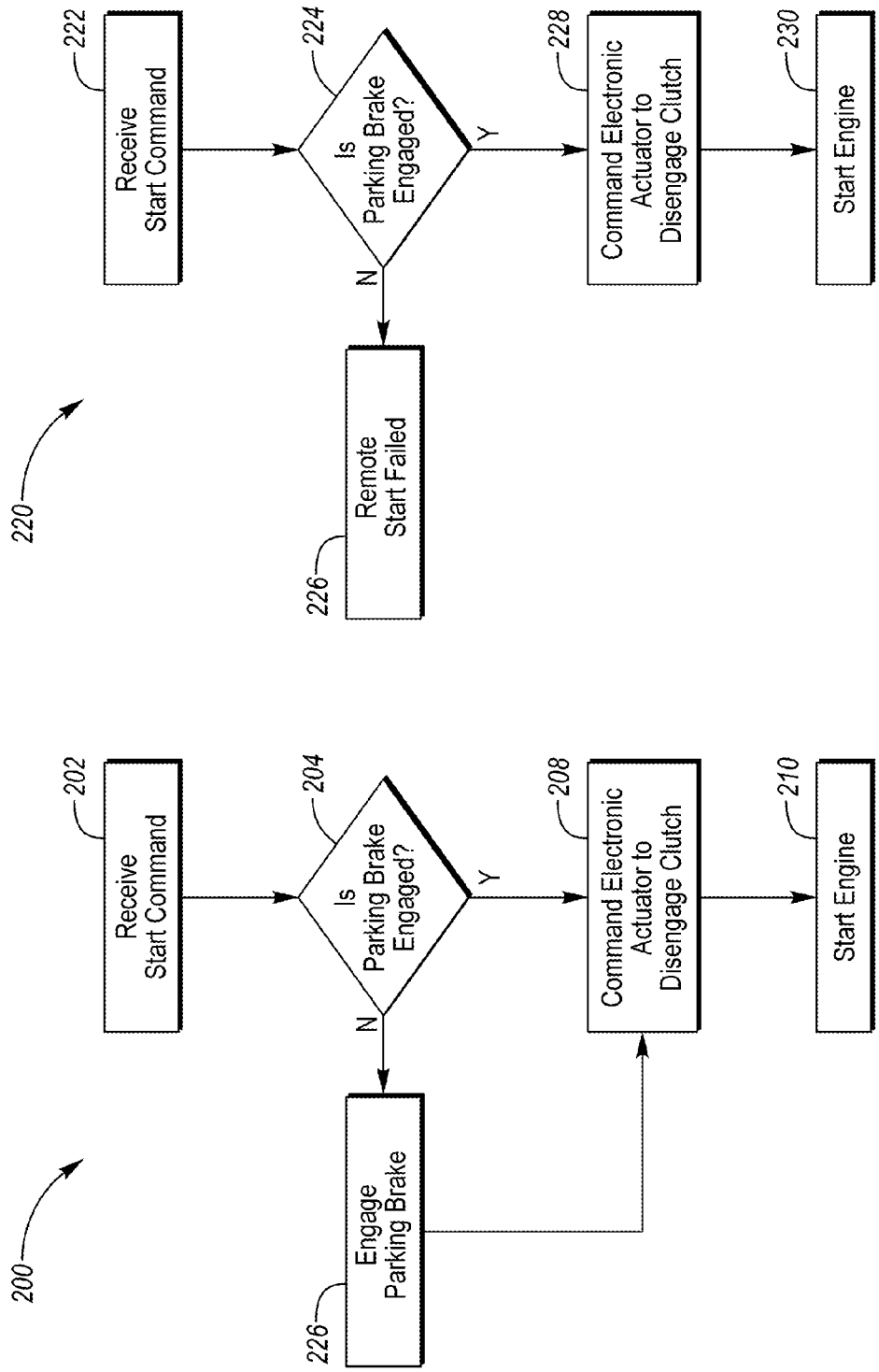
FIG. 6A is a flow chart illustrating a method for remote starting a manual-transmission vehicle according to one embodiment.
FIG. 6B is a flow chart illustrating a method for remote starting a manual-transmission vehicle according to another embodiment.

FIGS. 6A and 6B illustrate example algorithms for remote starting a manual-transmission vehicle that includes an electronic actuator. The algorithm of FIG. 6A may be used in vehicles that include an electronic parking brake and the algorithm of FIG. 6B may be used in vehicles that include a manual parking brake.

Referring to FIG. 6A, a method 200 for remote starting a manual vehicle begins at operation 202 when the controller receives a start command from a remote device such as a key fob or a cell phone. In response to receiving a start command, control passes to operation 204 and the controller determines if the electronic parking brake is engaged. If no, control passes to operation 206 and the controller commands engagement of the parking brake. If yes, control passes to operation 208 and the controller commands the electronic actuator to fully disengage the clutch disc from the flywheel. Once the clutch is open, the controller issues a start command to the engine at operation 210.

Referring to FIG. 6B, a method 220 for remote starting a manual vehicle begins at operation 222 when the vehicle receives an engine start signal from a remote device. At operation 224 the controller determines if the parking brake is engaged. In this embodiment the parking brake is a manual parking brake; the vehicle controller cannot command engagement of the parking brake. Thus, if no at operation 224, the control strategy is exited at 226 because remote start cannot safely take place. If the parking brake is engaged, control passes to operation 228 and the controller commands the electric actuator to disengage the clutch. Once the clutch is open, the controller issues a start command to the engine at operation 230. The vehicle may exit remote start mode when the driver turns the ignition key (or depresses the START button) while the clutch pedal is depressed.

The addition of the electric actuator 38 also enables the vehicle 20 to have a traffic-assist mode in which the controller operates the clutch 26, using actuator 38, allowing the driver to operate the vehicle using the accelerator pedal and the brake pedal during low-speed driving. This mode may be available when the vehicle is in first gear. Traffic-assist mode is particularly useful in stop-and-go traffic where near-constant operation of the clutch by the driver is sometimes required.

Traffic-assist mode may be commenced in response to driver command. For example, a traffic-assist interface 150 may be disposed within the passenger cabin. In one embodiment, the interface is a push button that is mounted on the dashboard or on the gear shifter. The control system for traffic assist may include interlocks (or checks) that prevent the vehicle from entering into traffic-assist mode when the button is pressed if certain parameters are not met. For example, traffic-assist mode may only be available in first gear. Thus, the system disables traffic-assist mode when the transmission is a gear other than first. Other checks include requiring the clutch pedal be depressed when the traffic assist button is pressed by the driver, the vehicle being below a threshold speed, or the engine being below a threshold speed.

Figure 7:
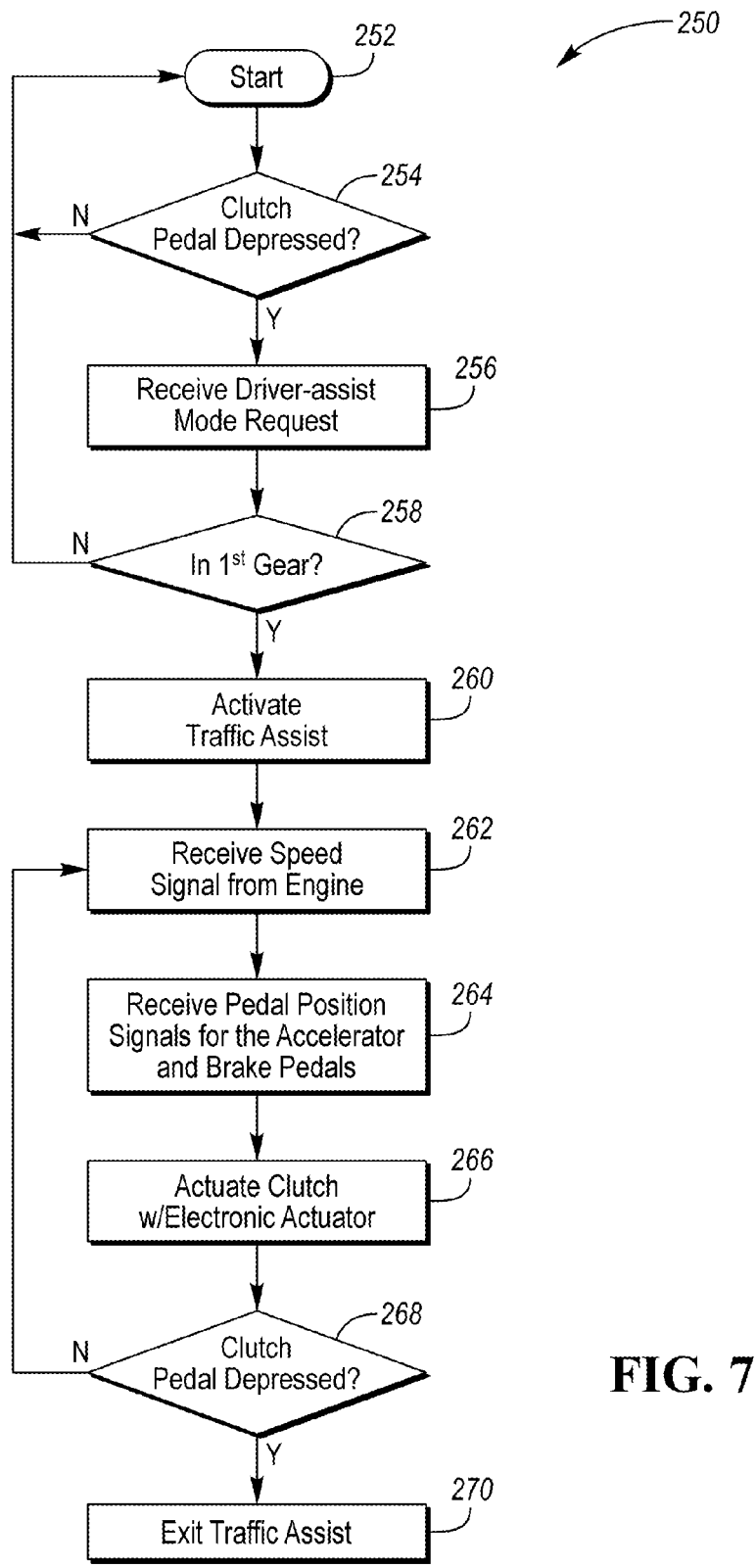
FIG. 7 is a flow chart illustrating a method for operating a manual-transmission vehicle in traffic-assist mode.

FIG. 7 illustrates an example algorithm 250 for controlling the vehicle during traffic-assist mode. The algorithm begins at operation 254 when the driver request traffic-assist mode via the interface. At operations 256 and 258, the controller checks to see if the clutch pedal is depressed and the transmission is in first gear while traffic-assist mode is being requested. If either of these checks fail, traffic-assist mode is not entered and control loops back to the start. If both of the checks pass, traffic-assist mode is activated at operation 260. A display disposed within the passenger cabin may present a message to the driver notifying that the vehicle is in traffic-assist mode. The message may prompt the driver to release the clutch pedal. During traffic-assist mode, the clutch is operated by the electrical actuator according to signals received from various components of the vehicle powertrain. At operation 262 the controller receives speed signals from the engine. At operation 264 the controller receives pedal position signals from the accelerator and brake pedals. At operation 266 the controller commands actuation of the clutch via the electronic actuator 38 according to the signals received from the engine, and the accelerator and brake pedals.

Traffic-assist mode may be exited in a variety of ways including depression of the clutch pedal, pressing the traffic-assist interface, or exceeding a threshold speed of the vehicle. In algorithm 250, traffic-assist mode is exited by operation of the clutch pedal. At operation 268 the controller determines if the clutch pedal is depressed. If the clutch pedal is not depressed, the vehicle continues in traffic-assist mode and control loops back to operation 262. If the clutch pedal is depressed at operation 268, control passes to operation 270 and the controller exit traffic assist mode.

While example embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine;
   a manual transmission;
   a clutch including a disk biased to engage a flywheel, a manually operated first actuator that disengages the disk, and a second actuator that disengages the disk responsive to an electric signal; and
   a controller configured to
      receive an engine start signal and engage a parking brake,
      command the second actuator to disengage the disk, and
      start the engine responsive to the second actuator disengaging the disk.

2. The vehicle of claim 1 further comprising a parking brake, wherein the controller is further configured to receive a status signal indicating an engagement state of the parking brake, and in response to the status signal indicating that the parking brake is engaged, start the engine.

3. The vehicle of claim 1, wherein the engine start signal emanates from a device remote from the vehicle.

4. The vehicle of claim 1, wherein the clutch further includes a pressure-plate assembly connected to the flywheel and having a spring biased to frictionally engage the disk with the flywheel, and a bearing slidably received on an input shaft of the transmission, wherein the bearing is connected to at least one of the actuators and is operable to disengage the disk in response to one of the actuators forcing the bearing into the spring.

5. The vehicle of claim 4, wherein the bearing is a pair of bearings concentrically arranged relative to each other, and wherein the first actuator further includes a fork connected to one of the bearings, the second actuator further includes a fork connected to the other of the bearings.

6. The vehicle of claim 1, wherein the second actuator further includes a spindle driven by an electric motor and a fork arranged to disengage the disk in response to rotation of the spindle.

7. The vehicle of claim 6, wherein the electric motor is mounted to an inside surface of a bell housing of the transmission.

8. The vehicle of claim 1, wherein the manual transmission further includes a gearbox configured to establish various power-flow paths between an input shaft and an output shaft in response to movement of a driver-operated gear shifter.

9. A vehicle comprising:
a transmission;
a clutch selectively engaging an engine and the transmission and including a first actuator altering clutch capacity responsive to pedal movement and a second actuator altering clutch capacity responsive to an electronic signal; and
a controller configured to, responsive to a request for traffic assist and the transmission being in first gear, command the second actuator to alter the clutch capacity based on engine speed, accelerator-pedal position, and brake-pedal position.

10. The vehicle of claim 9 further comprising a traffic-assist interface disposed in a cabin of the vehicle, wherein traffic assist is request by a driver via the traffic-assist interface.

11. The vehicle of claim 9, wherein the controller is further configured to deactivate traffic assist in response to driver actuation of the pedal.

12. The vehicle of claim 9, wherein the clutch further includes a bearing slidably received on an input shaft of the transmission, the bearing being connected to the second actuator.

13. The vehicle of claim 9, wherein the second actuator further includes an electric motor that drives a ball screw mechanism that alters the clutch capacity in response to rotation of the electric motor.

14. The vehicle of claim 9, wherein each of the first and second actuators includes a fork operable to independently engage a spring of the clutch to alter the clutch capacity.

15. A manual transmission for a vehicle comprising:
a gearbox configured to establish various power-flow paths between an input shaft and an output shaft in response to movement of a driver-operated gear shifter;
a dry friction clutch including a disk disposed on the input shaft, a first bearing slidably supported on the input shaft, a second bearing slidably supported on the input shaft, and a pressure-plate assembly connectable to an engine flywheel, the pressure-plate assembly having a pressure plate and a spring that biases the pressure plate to frictionally engage the disk and the flywheel;
a first clutch actuator including a first fork connected to the first bearing and operable to disengage the clutch in response to depression of a clutch pedal; and
a second clutch actuator arranged in parallel with the first clutch actuator and including an electric motor having a spindle, and a second fork connected to the second bearing operable to disengage the clutch in response to rotation of the spindle, wherein the first and second bearings are independently operable to reduce torque capacity between the disk and the flywheel in response to one of the forks urging one of the bearings into the spring.

16. The transmission of claim 15, wherein the second actuator further includes a ball screw mechanism that actuates the second fork in response to rotation of the spindle.

17. The transmission of claim 15, wherein the first actuator further includes a slave cylinder that actuates the first fork according to input from the clutch pedal.

* * * * *